United States Patent [19]
Prinzhorn

[11] 3,812,578
[45] May 28, 1974

[54] METHOD OF PREPARING TWO WAVE GUIDES OF DIFFERING CROSS SECTION FOR INTERCONNECTION

[75] Inventor: Klaus Prinzhorn, Celle, Germany

[73] Assignee: Kabel -und Metallwerke Gutehoffnungschutte Aktiengesellschaft, Hanover, Germany

[22] Filed: Sept. 13, 1971

[21] Appl. No.: 179,955

[30] Foreign Application Priority Data
Sept. 22, 1970 Germany............................ 2046525

[52] U.S. Cl. ................................ 29/600, 333/98 R
[51] Int. Cl. .......................................... H01p 11/00
[58] Field of Search ........ 29/600, 601, 237; 72/370; 82/4.3; 144/205; 285/382; 333/34, 98 R

[56] References Cited
UNITED STATES PATENTS
3,040,277  6/1962  Ohm ................................... 333/34
3,500,264  3/1970  Floyd Jr. .......................... 29/600 X Primary Examiner—Charles W. Lanham
Assistant Examiner—Robert M. Rogers
Attorney, Agent, or Firm—Ralf H. Siegemund

[57] ABSTRACT

Two wave guides of different cross sections are prepared for interconnection by working the end of one of the two wave guides so that the end face proper thereof assumes the cross-sectional contour of the other one of the wave guides followed by a transition in axial direction between said same cross-sectional contour and the original one of the one wave guide.

3 Claims, 8 Drawing Figures

PATENTED MAY 28 1974 3,812,578

INVENTOR:
Klaus Prinzhorn
Smyth, Roston & Pavitt
By Ralf H. Siegemund
ATTORNEYS

METHOD OF PREPARING TWO WAVE GUIDES OF DIFFERING CROSS SECTION FOR INTERCONNECTION

The present invention relates to a method for providing for transition between two wave guides to be interconnected but having differing cross sections. More particularly, but not exclusively, the invention relates to preparations for interconnecting a wave guide with elliptical cross section and a wave guide with rectangular cross section; both kinds of wave guides being widely used at the present time.

Interconnecting two wave guides with differing cross section poses immediately the problem that the transitional zone may provide great disturbance in the transmitted electrical wave energy and phase pattern, unless steps are taken to carefully avoid the setting-up of significant error modes. Equipment has been used heretofore, which provides for a stepwise change in cross section. Such cross sectional adaptors are placed in a wave guide transmission path and system, at distances from each other, which depend upon the frequency of the energy to be transmitted. These adapter elements are, of course, especially constructed, for that purpose alone; they are very costly and require highly accurate manufacturing, very accurate installation, local tuning, etc. Aside from the fact that they are particularly constructed parts, the fact that separate parts are needed at all, is per se a cost increasing factor. The German Pat. No. 1,271,228, for example, describes such equipment, which includes two transition pieces destined to connect an elliptical wave guide to one with a rectangular cross section.

It is an object of the present invention to provide method that facilitates the interconnection of two wave guides of differing cross section so as to make such connections less expensive than those of the known variety. In accordance with the preferred embodiment of the present invention, it is suggested to deform an end section of one of the wave guides, preferably the one of larger perimeter, so as to provide a gradual, integral transition section in the one wave guide and in axial direction therein, and wherein its own cross section changes into the cross section of the other wave guide. The invention has clearly the advantage that transition from one cross section to the other one is no longer provided by and in a separate element. The working of the end portion of one of the wave guides who effect the change in cross section, is relatively simple, and actually does not require much additional work; particularly in terms of man-hours the expenditure is not higher than just the installation of the known transition components. Moreover, the tools needed are quite simple.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
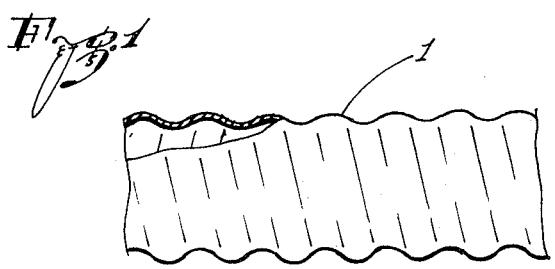
FIGS. 1 and 1a illustrate respectively front and side views of a wave guide with elliptical cross section.
Figure 1A:
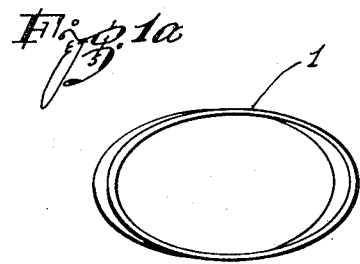
Figure 2:
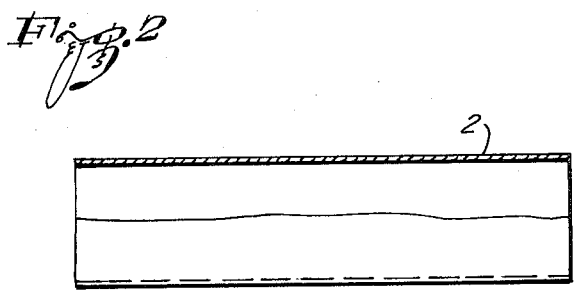
FIGS. 2 and 2a illustrate respectively front and side views of a wave guide with a rectangular cross section.
Figure 2A:
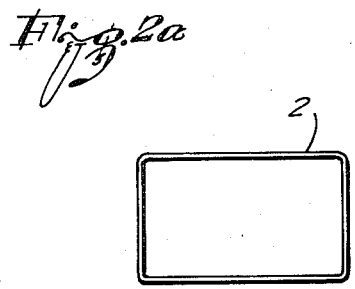
Figure 3:
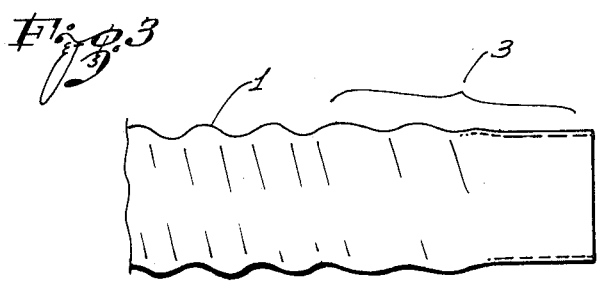
Figure 3A:
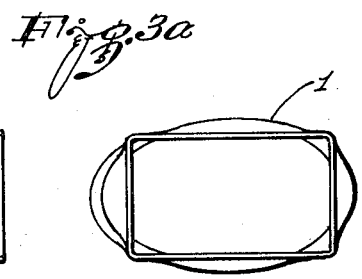
Figure 4:
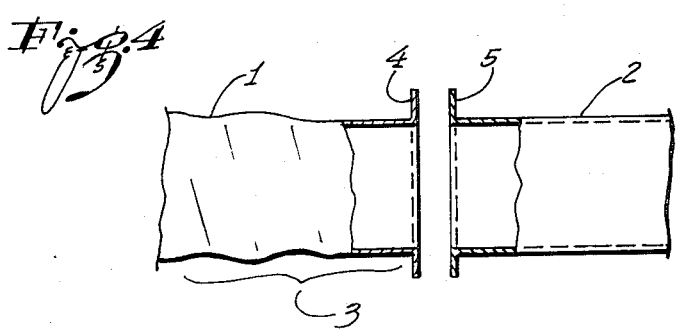
Figure 5:
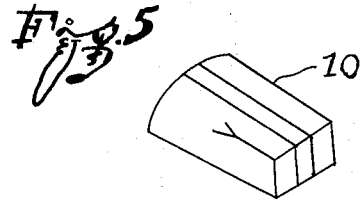

FIGS. 3 and 3a illustrate respectively front and side views of the wave guide shown in FIG. 1 after its end has been adapted to match the cross section of the wave guide shown in FIG. 2; and FIG. 4 illustrates the last step of interconnecting two wave guides one of which having been provided with an integral transition section; and FIG. 5 illustrates an isometric view of a tool that can be used to practice the invention.

Proceeding now to the detailed descriptions of the drawings, FIG. 1 illustrates a first wave guide 1, having elliptical cross section. In order to have improved flexibility (or to have flexibility at all), this particular wave guide element is corrugated, which also improves transverse stability. Wave guides of this type are known, and a convenient method of making such a wave guide involves, for example, longitudinally folding metal strip into a split tube, axially welding same and corrugating the tube so made.

FIG. 2 now illustrates a second type of wave guide, 2, having rectangular cross section, conventionally made. It is now assumed that wave guide 1 (FIG. 1) is to be connected to wave guide 2 (FIG. 2). The method in accordance with the invention permits the making of such connection, particularly in a manner which does not provide any "weak" point as far as the conduction of electrical energy is concerned and avoids undue reflection in the wave guide.

It is now presumed that the perimeter of the ellipse of wave guide 1 around the cross-sectional circumference is not smaller than the perimeter of the rectangle of the cross section of wave guide 2. The integral transition section will, thus, be provided in the wave guide of larger perimeter. The end of wave guide 1 is now deformed so that for a certain length the cross section changes gradually from elliptical contour to a rectangle. The transition from elliptical cross section to rectangular cross section will, of course, have configuration so that long and short axes of the ellipse respectively are parallel to long and short sides of the rectangle; also the corrugation pattern will gradually emerge (or erased) from that transition zone. There will be some up-setting of material at the newly formed cross section, as the perimeter of the latter must equal the perimeter of the cross section of the other wave guide.

The method in accordance with the invention is, for example, carried out by inserting a core element 10 into the elliptical wave guide 1 see FIG. 5. That core may have one end with elliptical cross section to permit ready insertion into the wave guide 1. The other end of the tool core has rectangular cross section. The transition from one type of cross section to the other one in the core is a gradual one or in steps.

At first, the core is inserted in wave guide 1 as far as possible, and then the end proper of the wave guide is deformed by a cold working process resembling press working or by hammering, or by a combination thereof. This way, the end receives some rectangularity, but usually not immediately the final rectangular shape and contour. Rather, the first working step permits further insertion of the core to serve as anvil or chuck for the next step. Thus, gradually or in steps, the core is more and more inserted into wave guide 1, and an end section of wave guide 1 is worked into a transition section 3 of the desired contour (FIG. 3).

If the perimeters differ, e.g., if the rectangle has smaller perimeter than the ellipse, lugs will gradually be formed in the corners of the emerging rectangle to take up the residual material. These lugs or corner flushes can then be squeezed off. Subsequently, the core is removed and the two wave guides, 1 and 2, are now ready to be directly interconnected.

The two rectangular ends of both wave guides may be flanged as shown in FIG. 4, and the flanges 4 on wave guide 1 are to be connected to the flanges 5 provided at the end of wave guide 2, e.g., by means of bolting or abutting flanges soldered or welded together, or in any other known manner.

The transition section 3 may be made as gradually as desired, the core used as chuck or anvil tool may be as long as needed. Important is only that the transition be a gradual one to avoid internal reflection.

The invention has been explained with reference to the providing of an integral transition between elliptical and rectangular wave guides but other types of transition can readily be provided for, such as a change from circular to elliptical cross sections and others.

The invention is not limited to the embodiments described above but all changes and modifications thereof not constituting departures from the spirit and scope of the invention are intended to be included.

I claim:

1. Method of preparing first and second wave guides having different cross section contour, for being interconnected, the cross sections being different to such an extend that direct interconnection is not possible without significant disturbance in the wave transmission characteristics at such interconnection, comprising: the steps of working and deforming the end of the first wave guide having similar or larger perimeter than the second wave guide so that the contour of the end face proper of the first wave guide is changed and assumes the cross-sectional contour of second wave guide, continued in axial direction by worked integral transition of the first wave guide from said worked cross-sectional contour to the original contour of the first wave guide.

2. Method as in claim 1, using a tool that is comprised of a core element having at opposite ends respectively the two cross sections with gradual or stepwise transition, the working step including forcing the tool with one end into the one wave guide at matching cross sections, and working the one wave guide as progressively receiving the tool until the end of the one wave guide has obtained the cross section of the other wave guide, the core being removed subsequently.

3. Method of preparing a wave guide with round cross-section, elliptical or circular, for interconnection with a wave guide of rectangular cross-section, comprising the steps of:

cold working and deforming one end of the wave guide with round cross-section into an end of rectangular cross-section of identical configuration as the wave guide of rectangular cross-section, and working a portion of the wave guide with round cross-section adjacent said one end into a section of transition between round and rectangular cross-section.

* * * * *